United States Patent [19]

Inaba et al.

[11] Patent Number: 4,718,840
[45] Date of Patent: Jan. 12, 1988

[54] INJECTION/MEASUREMENT MECHANISM OF INJECTION MOLDING MACHINE

[75] Inventors: Yoshiharu Inaba, Kawasaki; Yamamura Masato, Hachioji, both of Japan

[73] Assignee: Fanuc Ltd., Minamitsuru, Japan

[21] Appl. No.: 890,772

[22] PCT Filed: Nov. 22, 1985

[86] PCT No.: PCT/JP85/00649
§ 371 Date: Jul. 23, 1986
§ 102(e) Date: Jul. 23, 1986

[87] PCT Pub. No.: WO86/03160
PCT Pub. Date: Jun. 5, 1986

[30] Foreign Application Priority Data

Nov. 24, 1984 [JP] Japan .................. 59-247011

[51] Int. Cl.⁴ .......................................... B29C 45/77
[52] U.S. Cl. ...................... 425/145; 264/40.7; 366/78; 425/149; 425/159; 425/376 B; 425/582; 425/583; 425/587

[58] Field of Search ............... 425/145, 149, 155, 159, 425/171, 204, 207, 208, 376 B, 376 R, 542, 558, 567, 574, 579, 582, 583, 585, 587; 264/40.5, 40.7; 366/78

[56] References Cited

FOREIGN PATENT DOCUMENTS 179631 10/1983 Japan .
174623 9/1985 Japan .

Primary Examiner—Jay H. Woo
Assistant Examiner—Timothy W. Heitbrink
Attorney, Agent, or Firm—Staas & Halsey

[57] ABSTRACT

A large-output injection/measurement mechanism of an injection molding machine, which uses measurement and injection servo motors as its drive source. A plurality of ball screws are rotatably provided between front and rear plates of the injection molding machine and are coupled to the injection servo motor. Ball nuts engaged with the plurality of ball screws are fixed on a pressure plate. The pressure plate is coupled to the measurement servo motor through a spline shaft and a rotational drive pipe spline-coupled thereto. The spline shaft is fixed on a screw sleeve rotatably fixed to the pressure plate. A screw fixed to the pressure plate is driven by the servo motors, thereby performing injection and measurement of a molding material.

3 Claims, 4 Drawing Figures

INJECTION/MEASUREMENT MECHANISM OF INJECTION MOLDING MACHINE

BACKGROUND OF THE INVENTION

The present invention relates to an injection molding machine and, more particularly, to an injection/measurement mechanism which can perform injection, measurement, and mixing with a large output and which is driven by a servo motor.

Injection molding machines, wherein a screw is rotated so that a measurement mechanism for performing measurement and mixing of a mold material is driven by a motor, are conventionally known. Most conventional injection molding machines which move screws forward in order to inject a molten molding material employ hydraulic units as drive sources. Some such conventional injection molding machines use servo motors as drive sources for their injection mechanisms, as described in Japanese Provisional Patent Publication Nos. 58-179630 and 59-156726. With these machines, however, it is difficult to obtain a large output.

SUMMARY OF THE INVENTION

It is an object of the present invention to provide an injection/measurement mechanism of an injection molding machine, which uses a servo motor as a drive source for its injection and measurement/mixing mechanisms and which can obtain a large output.

In order to achieve the above object, according to the present invention, at least two ball screws, which are rotatably provided between a front plate and a rear plate, the plates being fixed to a base of an injection molding machine, and an injection servo motor, which drives the at least two ball screws, are operatively coupled through a first transmission unit. A screw sleeve is rotatably fixed to a pressure plate on which ball nuts engaged with the at least two ball screws, respectively, are fixed. A screw and a spline shaft are fixed on the screw sleeve.

A rotational drive pipe coupled to the spline shaft and a measurement servo motor, which drives the rotational drive pipe, are operatively coupled through a second transmission unit. As a result, the respective servo motors drive the screw with a large drive force in the injecting direction, and rotate it.

In this manner, according to the present invention, servo motors can be used as the respective drive sources of the injection and mixing/measurement mechanisms, so that injection and measurement can be controlled easily. Furthermore, the outputs from injection and measurement servo motors are converted into a screw drive force along the injecting direction and a screw rotating force reliably and efficiently, so that an injection/measurement mechanism of a large output can be obtained.

DEETAILED DESCRIPTION OF THE PREFERRED EMBODIMENTS

Figure 1:
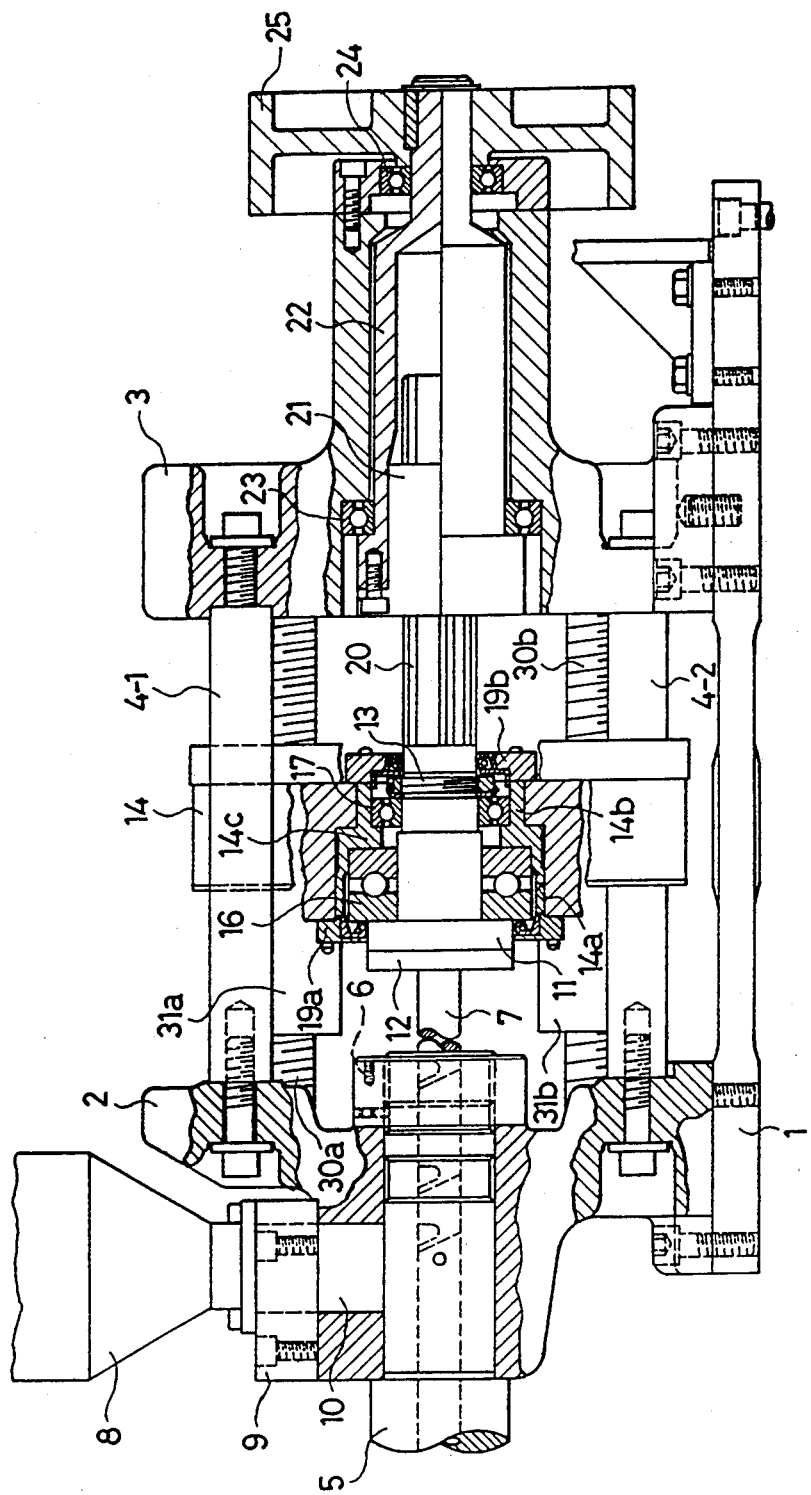
FIG. 1 is a partial sectional front view of an injection/measurement mechanism of an injection molding machine according to an embodiment of the present invention.
Figure 2:
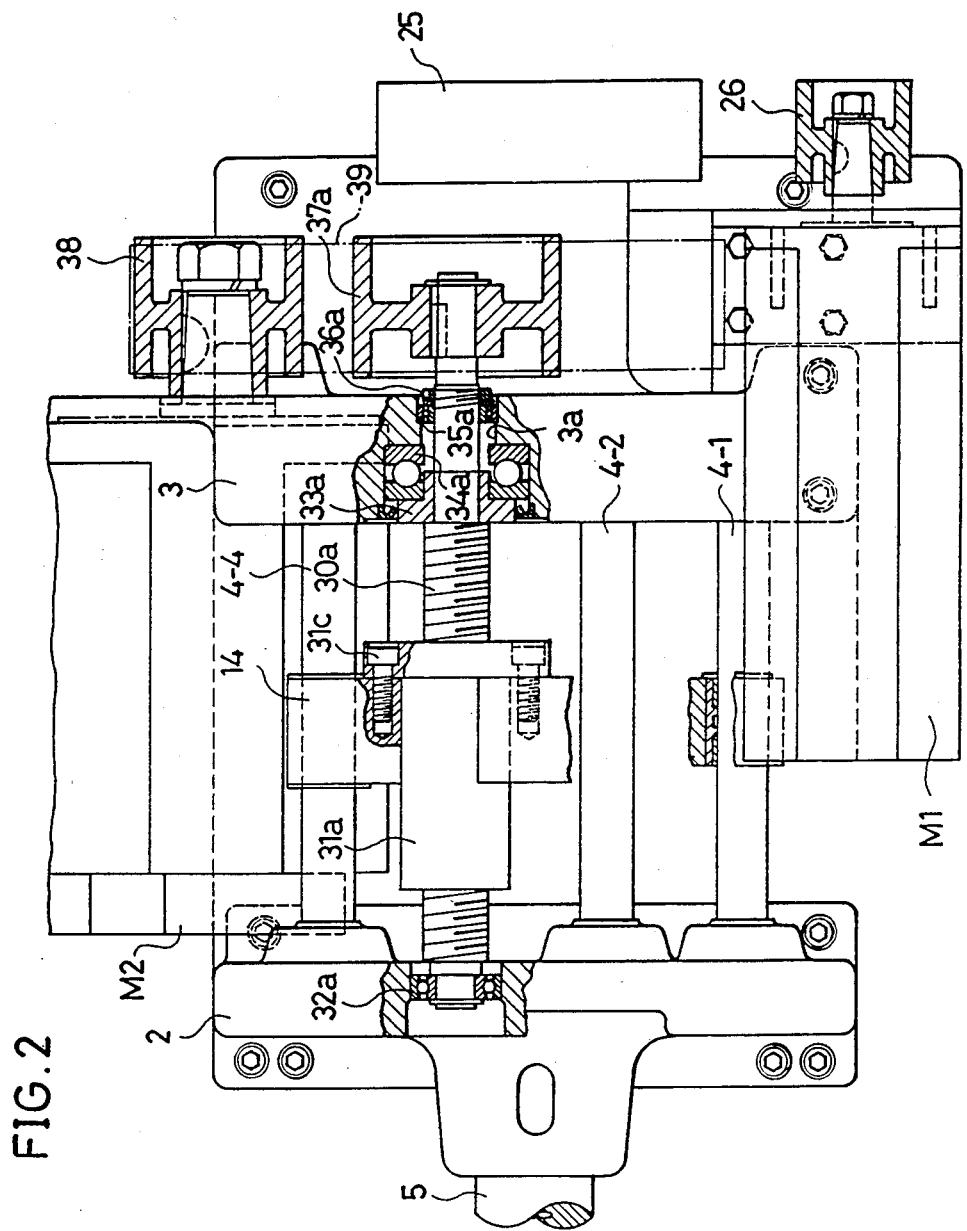
FIG. 2 is a partial sectional plan view of the unit shown in FIG. 1.
Figure 3:
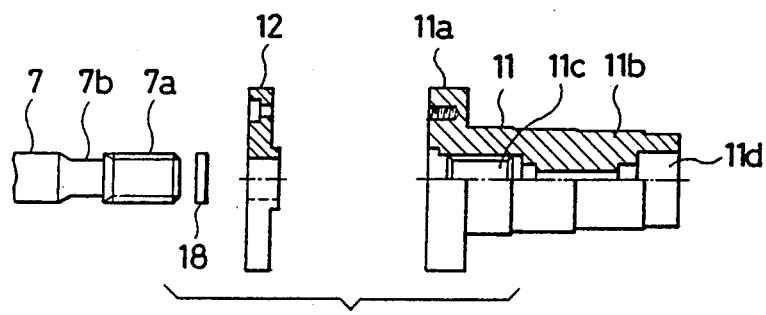
FIG. 3 is a partial sectional exploded view for explaining the connection relationship between a screw sleeve and a screw.

FIGS. 1 and 2 show an injection/measurement mechanism of an injection molding machine according to an embodiment of the present invention. In FIGS. 1 and 2, reference numeral 1 denotes a mount base for mounting the injection/measurement mechanism to the base of the injection molding machine. A front plate 2 and a rear plate 3 are fixed to the mount base 1 with bolts or the like. Four tie rods 4-1 to 4-4 are fixed between the front and rear plates 2 and 3 with bolts. A heating cylinder 5 is fixed to the front plate 2 with a barrel nut 6. A screw 7 is fitted in the heating cylinder 5. Reference numeral 8 denotes a hopper for charging a molding material into the heating cylinder 5. The hopper 8 is mounted on the heating cylinder 5 through a hopper base 9. The molding material is charged into the heating cylinder 5 through a hole 10. The screw 7 is rotatably fixed to a pressure plate 14 through a screw sleeve 11, a screw retainer 12, a nut 13, and so on. More specifically, the screw sleeve 11 is rotatably held by the pressure plate 14 through thrust and radial bearings 16 and 17. The thrust and radial bearings 16 and 17 are abutted against the two end faces of an intermediate vertical wall 14c and are housed in a bearing retainer 14b fixed in a central stepped hole 14a of the pressure plate 14. As shown in FIG. 3, the screw sleeve 11 has a flange 11a at its one end on the screw 7 side, and a screw 11b at its other end. The thrust and radial bearings 16 and 17 are urged against the bearing retainer 14b fixed to the pressure plate 14 by the nut 13 engaged with the screw 11b and by the flange 11a. Thus, the screw sleeve 11 is fixed on the pressure plate 14 to be stationary along the axial direction.

As shown in FIG. 3, a square hole 11c, which is engaged with an end portion 7a at the distal end of the screw 7 and having a square cross-section, is formed in the sleeve 11. A screw cushion 18 made of a material having toughness is arranged in the bottom of the square hole 11c. The screw sleeve 11 and the screw 7 are coupled to each other through the screw cushion 18 such that the square end portion 7a is fitted in the square hole 11c. The screw retainer 12 is engaged with a small-diameter portion 7b of the screw 7. The screw retainer 12 is fixed to the flange 11a of the screw sleeve 11 with a bolt (not shown), so that the screw 7 and the screw sleeve 11 are integrally fixed to each other.

Figure 4:
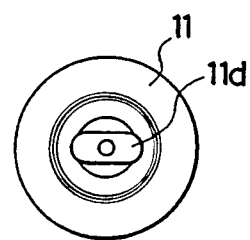
FIG. 4 is an end face view of the screw sleeve of FIG. 3 seen from the right side.

A square hole 11d is formed in the other end face of the sleeve 11, as shown in FIG. 4. The square hole 11d receives a square column (not shown) provided on one end of a spline shaft 20. The screw sleeve 11 and the square column are coupled with a bolt (not shown) through a bolt hole (not shown) formed in the portion of the square hole 11d of the screw sleeve 11. As a result, the rotation of the spline shaft 20 is transmitted to the screw sleeve 11 and the screw 7, so that the members 20, 11, and 7 are rotated integrally. The external gear of the spline shaft 20 is engaged with the internal gear of a nut 21. The nut 21 is fixed to a rotational drive pipe 22 with a bolt. The rotational drive pipe 22 is rotatably supported on the rear plate 3 through bearings 23 and 24. A pulley 25 is fixed to the other end of the spline shaft 20 with a key or the like. The pulley 25 is rotated by a measurement servo motor M1 (refer to FIG. 2)

through a pulley 26 (FIG. 2) and a timing belt (not shown).

The pressure plate 14 is guided by the four tie rods 4-1 to 4-4 extending through through holes formed in its peripheral portion. At the same time, ball nuts 31a and 31b, respectively engaged with two ball screws 30a and 30b, are fixed to the plate 14 with bolts (one bolt is shown as a bolt 31c in FIG. 2). The ball screws 30a and 30b are rotatably provided between the front and rear plates 2 and 3 to be symmetrical with respect to the axis of the screw 7. In FIG. 2, reference numeral 32a denotes bearings for rotatably supporting the ball screw 30a on the front plate 2; 33a, a spacer; 34a, thrust bearings; 35a, radial bearings; and 36a, a nut engaged with a screw provided to the rear end of the ball screw 30a. The nut 36a and the spacer 33a urge the thrust and radial bearings 34a and 35a against the stepped inner peripheral end surfaces of a hole 3a in the rear plate 3 so as to rotatably fix the ball screw 30a on the rear plate 3. Furthermore, a pulley 37a is fixed to the rear end of the ball screw 30a through a key or the like. The arrangement of the ball screw 30a and its connection with the front and rear plates 2 and 3, the pressure plate 14, and the like are the same as for the ball screw 30b. A timing belt 39 extends between pulleys (one of them is shown by 37a) provided to the ball screws 30a and 30b and a pulley 38 driven by an injection servo motor M2.

The operation of the injection/measurement mechanism of this embodiment will be described.

First, the measurement servo motor M1 is driven to rotate the pulley 26, the timing belt (not shown), and the pulley 25. This rotates the rotational drive pipe 22, the nut 21 fixed thereto, and the spline shaft 20 spline-coupled to the nut 21. Then, the screw sleeve 11 is also rotated through the connection of the square column formed on the distal end face of the spline shaft 20 and the square hole 11d formed therein. Since the square hole 11c formed in the screw sleeve 11 is engaged with the square column formed on the rear end of the screw 7, the screw 7 is rotated as well. Upon rotation of the screw 7, the molding material fed from the hopper 8 into the heating cylinder 5 is plasticized by the rotation of the screw 7, is melted, and is accumulated in the distal end portion of the heating cylinder 5. The screw 7 is then pushed backward (to the right in FIG. 1) by the reaction force of the molten material. The backward urging force of the screw 7 urges the pressure plate 14 and the ball nuts 31a and 31b fixed thereto backward, so that the ball screws 30a and 30b engaged with the ball nuts 31a and 31b are rotated. The rotation of the ball screws 30a and 30b is transmitted to the pulley 38 fixed to the drive shaft of the injection servo motor M2 through pulleys (one of which is shown by 37a) and the timing belt 39. Subsequently, a predetermined current is supplied to the servo motor M2, in order to drive the screw 7 in the forward direction, i.e., in a direction against the pressure of the molten material, thereby supplying a predetermined force (back pressure) to the screw 7.

In this manner, measurement and mixing are performed by the rotation of the screw 7 with the predetermined back pressure. When the screw 7 is moved backward to a measurement position, the drive of the measurement servo motor M1 is stopped, thereby completing the measurement/mixing process.

When the molding material is to be injected, the injection servo motor M2 is driven in order to rotate the pulley 38, the timing belt 39, pulleys (one of which is shown by 37a), and the ball screws 30a and 30b. Upon rotation of the ball screws 30a and 30b, the nuts 31a and 31b engaged therewith are moved forward, thereby moving the pressure plate 14 fixed to the nuts 31a and 31b forward. Then, the screw 7 fixed to the pressure plate 14 is also moved forward, thereby injecting the molten molding material into a mold (not shown).

In the above embodiment, two ball screws are used. However, a plurality of ball screws can be arranged at equal angular intervals along the circumferential direction of the screw 7. For example, when three ball screws are used, they can be arranged to be spaced apart by 120° from each other at the same distances from the axis of the screw 7. Furthermore, in the above embodiment, the screw sleeve 11 and the screw 7, or the screw sleeve 11 and the spline shaft 20 are coupled through the square hole and column. However, since the screw 7 rotates only in one direction, at least either the screw sleeve 11 and the screw 7, or the screw sleeve 11 and the spline shaft 20 can be coupled by threadable coupling at their coupling portions. In this case, the coupling portions can be threaded in a direction to screw down upon rotation of the screw, and the screw sleeve can be coupled with the screw, or the screw sleeve can be coupled with the spline shaft.

We claim:

1. An injection/measurement mechanism of an injection molding machine, comprising:
   (a) at least two ball screws rotatably provided between a front plate and a rear plate, said plates being fixed to a base of said injection molding machine;
   (b) an injection servo motor for driving said at least two ball screws;
   (c) a first transmission unit for operatively coupling said at least two ball screws with said injection servo motor;
   (d) ball nuts engaged with said at least two ball screws, respectively;
   (e) a pressure plate for fixing said ball nuts thereon;
   (f) a screw sleeve rotatably fixed on said pressure plate;
   (g) a screw fixed on said screw sleeve;
   (h) a spline shaft fixed on said screw sleeve;
   (i) a rotational drive pipe spline-coupled with said spline shaft;
   (j) a measurement servo motor for driving said rotational drive pipe;
   (k) and a second transmission unit for operatively coupling said rotational drive pipe with said measurement servo motor.

2. A mechanism according to claim 1, wherein said screw sleeve is coupled to said spline shaft through a square hole formed in one thereof and a square column formed on the other thereof.

3. A mechanism according to claim 1, wherein said screw sleeve and said spline shaft comprise screws threaded in directions to screw down when said spline shaft is rotated for measurement, and are coupled through said screws.

* * * * *